July 18, 1939.  I. O. FOSTER  2,166,862

DIRECTION SIGNAL FOR VEHICLES

Filed Jan. 3, 1938

Inventor
I. O. Foster

By A. D. Adams

Attorney

Patented July 18, 1939

2,166,862

UNITED STATES PATENT OFFICE 2,166,862

DIRECTION SIGNAL FOR VEHICLES

Isaac Owen Foster, Bloomington, Ind.

Application January 3, 1938, Serial No. 183,201

2 Claims. (Cl. 177—329)

This invention relates to direction signals or indicators for vehicles and, among other objects, aims to provide a relatively rugged, easily repaired, clearly visible, highly brilliant and definitely understandable signal system designed to indicate to other vehicle drivers and pedestrians the intentions of a driver to turn from one lane of traffic to another, or to turn corners, or to make similar changes in the course or direction of the vehicle. The main idea is to provide a direction signal comprising a unique arrangement of illuminable tubes adapted to be mounted in a protective housing and so arranged that the signal of the driver is clearly visible to others outside of the vehicle.

Other aims and advantages of the invention will appear in the specification, when considered in connection with the accompanying drawing, wherein.

Figure 1:
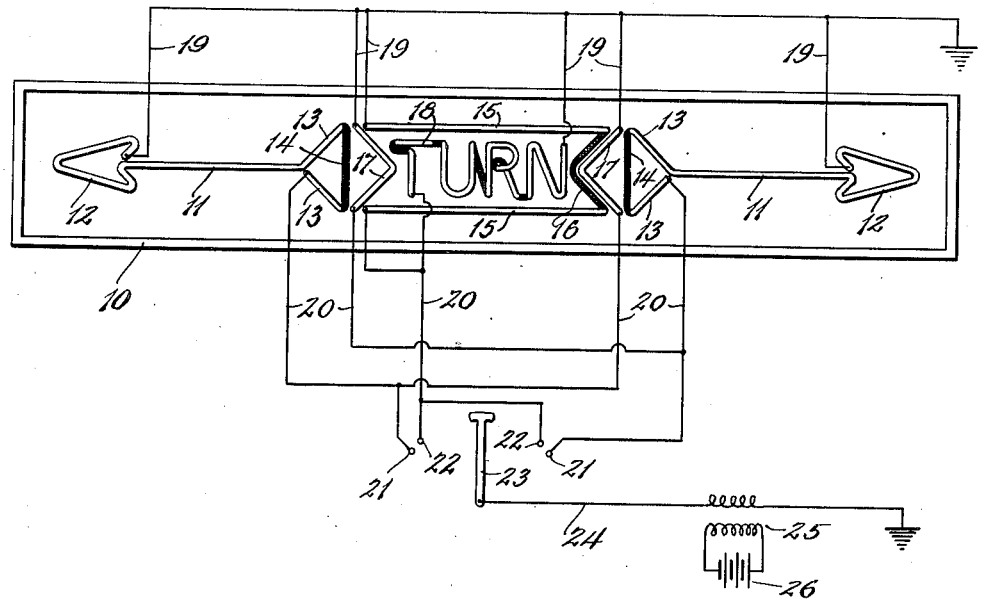
Fig. 1 is a diagrammatic illustration of a signal system embodying the invention.

Referring particularly to the drawing, the signaling device there shown is primarily designed for application to automobiles and is adapted to be applied to the back, top or front or both the back and front to signify to drivers of other vehicles and to pedestrians the intention of a driver to make a turn either to the right or to the left. It is composed of a combination of illuminable tubes, preferably, though not necessarily, filled with an inert gas, such as neon, argon, krypton or the like. However, mercury vapor or other substances capable of being illuminated electrically may be employed. Herein, tubes of the well known neon type are shown. In the illustrated form of the invention, there is shown a combination of such tubes arranged to be energized selectively to produce complete illuminated arrows and/or indicia indicating either a right or a left turn.

Referring to Fig. 1, the tubes are shown as being arranged within a suitable housing 10 which may be generally rectangular in outline and may be made of any suitable material. It is preferably provided with means (not shown), to secure it to the back, front or top of an ordinary vehicle and should conform generally to the shape of that part of the vehicle to which it is applied. The tubes are adapted to be supported in the well known manner within the casing by the well known types of insulating posts or other suitable securing devices connected to the wall of the casing. In this instance, the signal proper is shown as comprising right and left hand arrow tubes 11 each bent to form well defined arrow heads 12 and diverging angular branches 13 at their inner ends. Each arrow shaft is formed of a single bent tube with a portion 14 blanked out in the usual manner. The central portion of the signal tube is shown as being composed of a pair of horizontal parallel branches 15 also conveniently formed of a single tube with a portion 16 blanked out. Also, two separate angular tubes 17 are shown as being arranged opposite the angular branches 13 of the respective arrow shafts and may be placed in abutting or overlapping relation with respect to the ends of the angular branches 13. They are shown as being spaced for convenience of illustration. Within the space defined by the angular tubes 17 and the parallel branches 15 suitable indicia illuminable simultaneously with either arrow may be applied. In this example, a single tube 18 is shown as being bent to produce the word "turn" and is suspended or otherwise supported within said space. This indicia tube is preferably, though not necessarily, of a different color from that of the arrows. It may be filled with gas or other substance which produces the desired contrasting color or the glass tubing may be made of the contrasting color. It is contemplated, for example, that the arrows may be colored blue and the indicia green because these colors produce an excellent contrast and are highly visible. However, the invention is by no means limited to the use of these contrasting colors.

One end of the separate sets of tubes comprising the respective signals is shown as being grounded in the usual manner by a series of ground wires 19 and the other ends of said tubes are connected to conductors 20 which lead to a pair of dual point switch contacts 21, 22 controlled by a single switch element 23 which is representative of any type of manual switch applicable to a dash or any type of automatic switch which is controlled by the steering mechanism of a vehicle. It is understood that both a manually operable switch and an automatic switch may be employed to indicate the direction of turn desired. Such switches are well known in the art and require no further description in this specification. In this example, the switch element 23 is connected to a conductor 24 leading from the high side of an ordinary transformer 25 which is connected to a source of current 26 which may be and preferably is the ordinary automobile storage battery. Obviously, any suitable source of current may be employed for this purpose.

Figure 2:
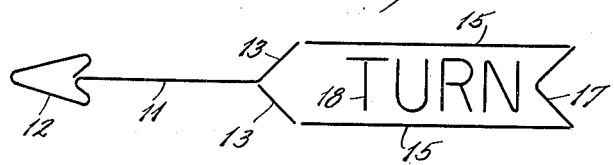
Fig. 2 is a diagrammatic view showing the outline of an illuminated arrow associated indicia-indicating an intended left turn.
Figure 3:
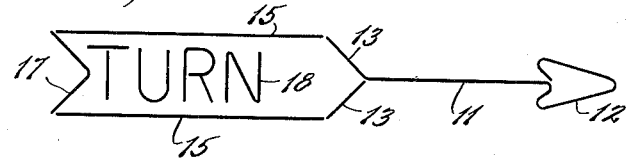
Fig. 3 is a similar diagrammatic view indicating an intended right turn.

Referring now to the illuminable elements to produce the respective right and left turn signals, the arrow shafts and the corresponding angular tubes 17 are shown as being connected by their conductors 20 to the respective contacts 21; while the parallel tube branches 15 and the "turn" indicia are both connected to each of the contacts 22, the arrangement being such that when the switch closes either pair of contacts, one of the arrow shafts, its corresponding angular tube at the end of the arrow tail, both the parallel tubes and the "turn" indicia are indicated. For example, when the switch member 23 is turned to the left, the left hand arrow shaft 11 with its associated parts, the angular tubes 17 at the right the parallel tubes 15 and the "turn" indicia will also be energized. The tube parts 13, 15 and 17 will thus produce the outline of the tail of a complete arrow and the length of the illuminated arrow, as shown, is more than half of the length of the signal casing. Its relative length and outline are indicated clearly in Fig. 2. Likewise, the outline produced by closing the other switch contacts for a right turn is indicated in Fig. 3. Thus, it will be seen that the distinct and clearly visible arrow heads are widely separated from the outlines of the tails, so that the signal is clear and unmistakable when at a considerable distance.

Obviously, the present invention is not limited to a strict conformity with the illustrated embodiment and the description thereof, but is capable of a wide variety of modifications within the scope of the appended claims.

What is claimed is:

1. An electrical signaling device for vehicles comprising, in combination, separate illuminable tubes bent to form arrow shafts with arrow heads pointing to the right and left respectively and spaced apart at their inner ends; three illuminable tubes between the inner ends of said arrow shafts one of which is bent to form an arrow tail portion common to both shafts and the other two of which respectively form an angular tail end for either of said arrow shafts; and a source of current connected to all of the tubes and having switch means arranged to energize either of the arrow shaft simultaneously with its tail portion to produce a brilliant, clearly visible and complete illuminated arrow pointing in the desired direction of turn.

2. An electrical signaling device for vehicles comprising, in combination, separate illuminable tubes bent to form arrow shafts with arrow heads pointing to the right and left respectively and spaced apart at their inner ends; three spaced illuminable tubes between the inner ends of and complemental to both arrow shafts to provide a well defined tail for either shaft; illuminable turn indicia of a contrasting color within the tail; electrical circuit connections for all of said tubes and turn indicia; and a single switch in the circuit connected to energize the tubes forming a complete left or right arrow together with the turn indicia.

ISAAC OWEN FOSTER.